Patented Mar. 19, 1940

2,194,079

UNITED STATES PATENT OFFICE 2,194,079

C-CYCLOHEXYL-DIPHENYLAMINES AND PROCESS FOR MAKING THEM

Frank B. Smith and Harold W. Moll, Midland, Mich., assignors to The Dow Chemical Company, Midland, Mich., a corporation of Michigan No Drawing. Application May 2, 1938, Serial No. 205,527

7 Claims. (Cl. 260—576)

This invention concerns certain new chemical products, namely diphenylamines substituted in either or both of the benzene nuclei by one or more cyclohexyl groups, as well as mixtures comprising such compounds. These compounds and their mixtures vary in physical properties from high-boiling, viscous liquids to crystalline solids. They are substantially insoluble in water but are soluble in a number of organic solvents such as acetone, carbon tetrachloride, toluene, etc. They may be employed as plasticizing agents for cellulose derivative, e. g. ethyl cellulose, cellulose acetate, etc., compositions and are also useful as rubber antioxidants and as intermediates in the preparation of other products such as dyestuffs, pharmaceuticals, etc.

The new cyclohexyl-diphenylamines are preferably prepared by reacting diphenylamine with cyclohexene in the presence of an acid-activated bleaching earth, such as "Retrol", "Tonsil", etc. If desired, however, other cyclohexylating agents, e. g. cyclohexyl chloride, cyclohexyl bromide, etc., may be employed. The reactants may be employed in any desired proportions depending upon the products desired. For example, a molecular excess of diphenylamine may be reacted with cyclohexene to produce a liquid mixture comprising unreacted diphenylamine, a relatively large amount of mono-cyclohexyl-diphenylamine, and small amounts of di-cyclohexyl- and poly-cyclohexyl-diphenylamines. A larger yield of the poly-substituted compounds may be obtained by decreasing the proportion of diphenylamine employed or by reacting cyclohexane with the mono- and di-substituted compounds obtained from a previous reaction. Ordinarily, we prefer to employ approximately 1-3 mols of cyclohexene per mol of diphenylamine. The amount of catalyst varies with the particular reactants employed and the conditions under which the reaction is carried out, but we usually employ between 0.02 and 0.10 part by weight of catalyst per part of diphenylamine.

The reaction is conveniently carried out by adding the cyclohexene to a heated mixture of diphenylamine and the catalyst, and thereafter heating and stirring the reaction mixture until the condensation is complete. The reaction temperature is usually between about 150° and 250° C., although somewhat higher temperatures may be employed if desired. The reaction is usually complete in from 4 to 30 hours, but a longer period may sometimes be required. After completion of the reaction, the catalyst is removed and the reaction mixture is distilled under vacuum to obtain the cyclohexylated diphenylamine product which is usually a mixture of mono- and poly-cyclohexyl-substituted diphenylamines.

The distilled product is ordinarily employed directly as a plasticizing agent, dye-stuff intermediate, etc., without further purification. If desired, however, it may be fractionally distilled into fractions representing isomeric mono-substituted - diphenylamines, di - substituted diphenylamines, etc. Also, such isomeric mixtures may be further fractionated to obtain the individual compounds contained therein, e. g. 4-cyclohexyl-diphenylamine, 4.4'-dicyclohexyl-diphenylamine, etc.

The following examples will illustrate several ways in which the principle of our invention has been applied but are not to be construed as limiting the same:—

Example 1

A mixture of 507 grams (approximately 3.0 mols) of a technical grade of diphenylamine and 10 grams of "Retrol" was placed in a flask fitted with a reflux condenser, water separator, thermometer, and stirrer, and was heated at a temperature of approximately 200° C. until all of the residual water contained in the "Retrol" had been driven off. 541 grams (6.6 mols) of cyclohexene was then added gradually with stirring over a period of 100 hours. During the initial part of the addition, considerable heat was evolved from the reaction and the temperature rose to 250° C. Upon completion of the reaction, the mixture was cooled to 150° C. and filtered while hot to remove the catalyst. The crude product thus obtained was a dark red viscous liquid. It was fractionally distilled under vacuum to obtain the following fractions:

Table

| Fraction No. | 1 | 2 | 3 | 4 | 5 |
|---|---|---|---|---|---|
| Product | Unreacted di-phenylamine. | Intermediate fraction. | Mono-cyclohexyl diphenylamines. | Di - cyclohexyl diphenylamines. | Poly-cyclohexyl diphenylamines. |
| Appearance | White crystalline solid. | Light yellow liquid. | Yellow crystalline mass. | Yellow viscous liquid. | Red viscous liquid. |
| Boiling range | Up to 200° C. at 20 mm. | 200°-250° C. at 20 mm. | 250°-270° C. at 20 mm. | 270°-300° C. at 20 mm. | Above 300° C. at 20 mm. |
| Melting point | 49°-50° C | | 32°-34° C | | |
| Specific gravity 80°/80° C. | | | 1.043 | 1.034 | |
| Refractive index | | | 1.6109 at 25° C | 1.5925 at 35° C | |

Example 2

A mixture of 169 grams (1.0 mol) of purified diphenylamine and 10 grams of "Retrol" was heated at 200° C. as in Example 1 until the residual water had been removed from the "Retrol". 181 grams (2.2 mols) of cyclohexene was then added gradually with stirring over a period of four hours during which time the temperature was maintained at approximately 200° C. Upon completion of the reaction, the "Retrol" was filtered off and the product obtained as a dark red viscous liquid. It was fractionally distilled under vacuum to give fractions corresponding to those obtained in Example 1.

In the following claims, the expression "C-cyclohexylated diphenylamine" refers to diphenylamine in which at least one nuclear hydrogen atom thereof has been substituted by the cyclohexyl group.

Other modes of applying the principle of our invention may be employed instead of those explained, change being made as regards the method herein disclosed or the materials employed, provided the method stated by any of the following claims be employed or the product claimed in any of the following claims be obtained.

We therefore particularly point out and distinctly claim as our invention:

1. C-cyclohexylated diphenylamine.
2. A mixture of mono- and poly-C-cyclohexylated diphenylamine.
3. A mixture consisting of isomeric mono-C-cyclohexyl-diphenylamines, said mixture being a yellow crystalline mass having a melting point of approximately 32°–34° C., and distilling between 250° and 270° C. under 20 millimeters pressure.
4. A mixture consisting of isomeric di-C-cyclohexyl-diphenylamines, said mixture being a yellow viscous liquid distilling between 270° and 300° C. under 20 millimeters pressure, and having a specific gravity of approximately 1.03 at 80°/80° C.
5. A method for the preparation of C-cyclohexylated diphenylamines which comprises heating a mixture of diphenylamine and cyclohexene to a reaction temperature below that at which decomposition of the mixture takes place and in the presence of an acid-activated bleaching earth.
6. A method for the preparation of C-cyclohexylated-diphenylamines which comprises heating a mixture of diphenylamine and cyclohexene to a temperature between about 150° and about 250° C. in the presence of an acid-activated bleaching earth.
7. A method for the preparation of a mixture of C-cyclohexylated-diphenylamines which comprises heating diphenylamine with from about 1 to about 3 molecular equivalents of cyclohexene at a temperature between about 150° C. and about 250° C. in the presence of an acid-activated bleaching earth.

FRANK B. SMITH.
HAROLD W. MOLL.